US012770986B2

(12) United States Patent
Moghimian et al.

(10) Patent No.: US 12,770,986 B2

(45) Date of Patent: Oct. 20, 2026

(54) RECHARGEABLE CYLINDRICAL BATTERY WITH GRAPHENE CENTERPIN, AND METHODS OF PRODUCING THE SAME

(71) Applicant: VoltaXplore Inc., Montreal (CA)

(72) Inventors: Nima Moghimian, Saint Laurent (CA); Soroush Nazarpour, Saint-Laurent (CA)

(73) Assignee: VoltaXplore Inc., Montreal (CA)

( * ) Notice: Subject to any disclaimer, the term of this patent is extended or adjusted under 35 U.S.C. 154(b) by 644 days.

(21) Appl. No.: 18/210,160

(22) Filed: Jun. 15, 2023

(65) Prior Publication Data

US 2023/0411804 A1 Dec. 21, 2023

Related U.S. Application Data

(60) Provisional application No. 63/352,814, filed on Jun. 16, 2022.

(51) Int. Cl.

*H01M 50/534* (2021.01)
*H01M 10/04* (2006.01)
*H01M 50/107* (2021.01)

(52) U.S. Cl.

CPC ....... *H01M 50/534* (2021.01); *H01M 10/049* (2013.01); *H01M 50/107* (2021.01)

(58) Field of Classification Search

CPC . H01M 10/049; H01M 50/107; H01M 50/534

See application file for complete search history.

(56) References Cited

U.S. PATENT DOCUMENTS

| | | | | |
|---|---|---|---|---|
| 7,858,218 | B2 | 12/2010 | Chang et al. | |
| 7,879,484 | B2 | 2/2011 | Hyung et al. | |
| 9,469,542 | B2 | 10/2016 | Bozalina et al. | |
| 2010/0021819 | A1 * | 1/2010 | Zhamu ................... | H01G 11/42 429/231.8 |

(Continued)

OTHER PUBLICATIONS

Behi et al., "Thermal management analysis using heat pipe in the high current discharging of lithium-ion battery in electric vehicles," Journal of Energy Storage 32: 101893, Published Dec. 1, 2020; [Available online Sep. 23, 2020 at https://www.sciencedirect.com/science/article/pii/S2352152X20317308]; 13 pages.

(Continued)

*Primary Examiner* — Sathavaram I Reddy

(74) *Attorney, Agent, or Firm* — COOLEY LLP

(57) ABSTRACT

Embodiments described herein relate to batteries with centerpins. In some aspects, a battery can include an electrode assembly formed in an annulus with a void volume in a center of the annulus, the electrode assembly including an anode and a cathode, a centerpin disposed in the void volume, the centerpin including graphene particles suspended in a polymer, the centerpin in physical contact with the electrode assembly and configured to provide structural support for the electrode assembly, and a battery housing disposed around an outside surface of the electrode assembly. In some embodiments, the void volume can be a first void volume, and the centerpin can include a second void volume. In some embodiments, the centerpin can include a slit that extends lengthwise along a length of the centerpin, the slit being an extension of the second void volume.

21 Claims, 7 Drawing Sheets

(56) References Cited

U.S. PATENT DOCUMENTS

2013/0230749 A1* 9/2013 Kim .................. H01M 10/0431
429/61

OTHER PUBLICATIONS

Shah et al., "Experimental and numerical investigation of core cooling of Li-ion cells using heat pipes," Energy 113, Published Oct. 15, 2016; [Available online on Jul. 29, 2016 at https://www.sciencedirect.com/science/article/abs/pii/S0360544216310003]; pp. 852-860.

* cited by examiner

RECHARGEABLE CYLINDRICAL BATTERY WITH GRAPHENE CENTERPIN, AND METHODS OF PRODUCING THE SAME

RELATED APPLICATIONS

This application claims priority and benefit of U.S. Provisional Application No. 63/352,814, filed Jun. 16, 2022 and titled "Rechargeable Cylindrical Battery with Graphene Centerpin, and Methods of Producing the Same," the disclosure of which is hereby incorporated by reference in its entirety.

TECHNICAL FIELD

Embodiments described herein relate to graphene-containing centerpins in batteries, and methods of producing the same.

BACKGROUND

Rechargeable batteries provide a reliable source of energy and are an increasingly important component of meeting the world's energy needs. However, safety and energy density issues remain as hindrances to large scale development of batteries and battery systems. Centerpins can be integrated into batteries for structural support to prevent electrode degradation. However, centerpins can add significant weight to each cell, thereby reducing the cell's gravimetric energy density. Lightweight, conductive centerpins can aid in addressing these issues.

SUMMARY

Embodiments described herein relate to batteries with centerpins. In some aspects, a battery can include an electrode assembly formed in an annulus with a void volume in a center of the annulus, the electrode assembly including an anode and a cathode, a centerpin disposed in the void volume, the centerpin including graphene particles suspended in a polymer, the centerpin in physical contact with the electrode assembly and configured to provide structural support for the electrode assembly, and a battery housing disposed around an outside surface of the electrode assembly. In some embodiments, the void volume can be a first void volume, and the centerpin can include a second void volume. In some embodiments, the centerpin can include a slit that extends lengthwise along a length of the centerpin, the slit being an extension of the second void volume. In some embodiments, the centerpin can include a first terminal end and a second terminal end, wherein at least one of the first terminal end or the second terminal end is tapered. In some embodiments, the battery housing includes a first terminal end and a second terminal end, the first terminal end including a cap assembly.

DETAILED DESCRIPTION

Figure 1:
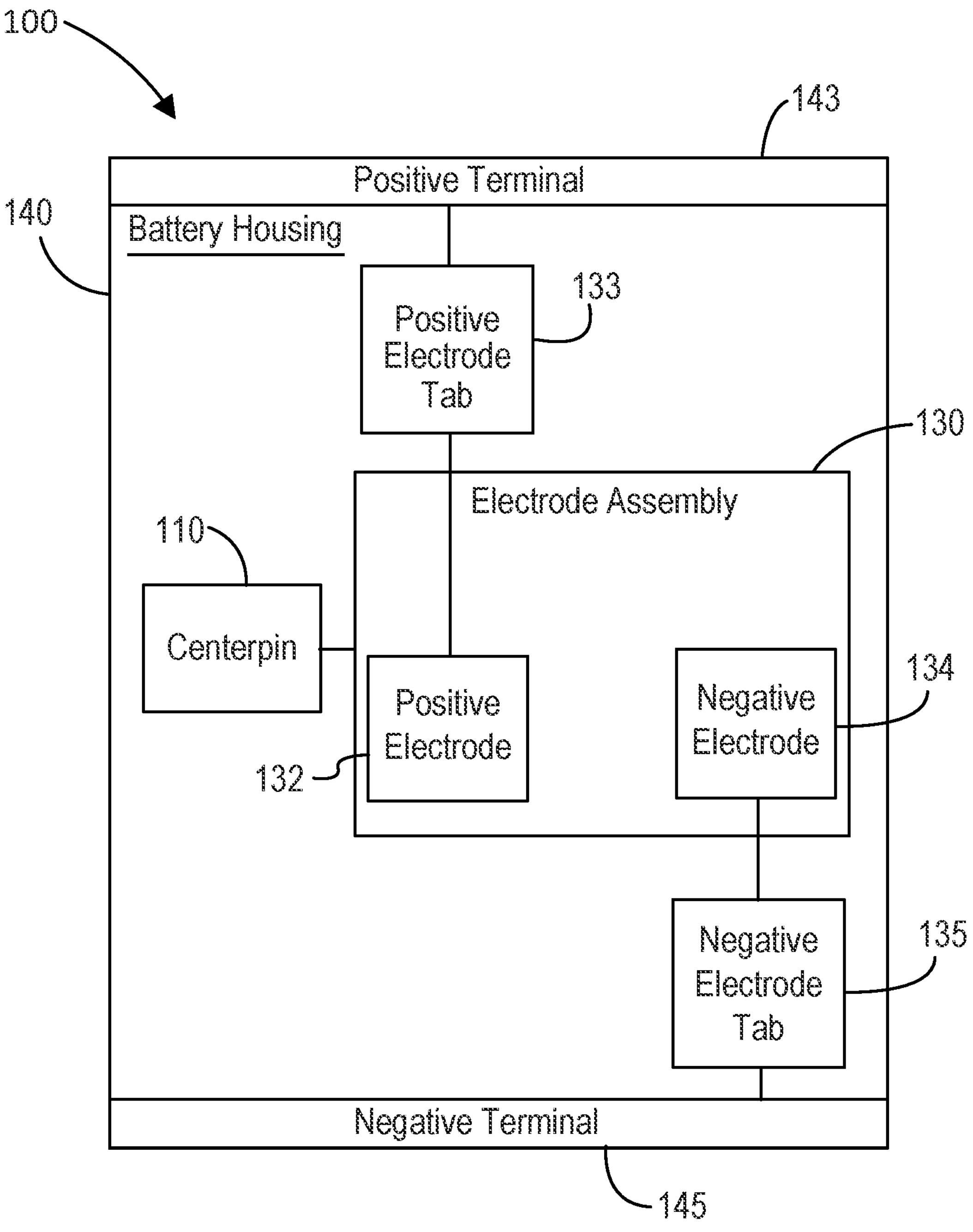
FIG. 1 is a block diagram of a battery with a centerpin that includes graphene, according to an embodiment.

Embodiments described herein relate to batteries with graphene-containing centerpins, and methods of producing the same. In some embodiments, the centerpins described herein can be incorporated into cylindrical, rechargeable batteries. Centerpins described herein can be inert, lightweight, and mechanically robust for enhanced safety in extreme conditions. Centerpins can also enhance heat conduction inside the cell during charge and discharge cycles. A cylindrical rechargeable battery includes a positive and negative electrode assembly, and can be formed into a "jelly-roll" shape inside a cylindrical housing. A centerpin can be positioned within a hollow space in the middle of the jelly roll and a cap assembly can be attached to a terminal side of the can.

Conventional centerpins are often made from metals, including steel or aluminum. The centerpins described herein include graphene and polymers for lightweight support of the cylindrical electrode assembly and heat relief. In some embodiments, centerpins described herein can include hollow tubes to allow for gas to escape toward vents in the terminal ends of the battery during thermal runaway. Centerpins can also include a side slit, such that the centerpin has a C-shaped cross section. Additionally, centerpins described herein can be electrically detached from the electrodes and current pathways within the battery. Centerpins can extend the full length of a battery's housing assembly or less than the full length of the battery's housing assembly. Centerpins can be placed inside the core of the battery after the winding of the jelly roll in a cylindrical cell (e.g., 18650, 21700, or 46800 cells). Therefore, ease of insertion of the centerpin is an important aspect of the battery during assembly.

Centerpins stabilize the structure of the jelly roll in the center of the battery, especially during the operation of the battery when the electrodes swell and shrink with charge/discharge cycles. Hence, deformation of the electrodes is limited when a centerpin is present. The centerpin also limits the uncontrolled destruction of cell housing when thermal runaway happens as it limits extreme cell deformation during the thermal runaway that can happen when the center of the jelly roll is hollow. The graphene-containing centerpin can also conduct heat and act as a heat pump to thermally stabilize the cell during fast charge and discharge when excessive heat is generated. Heat transfer capacity can be increased by increasing the concentration of the graphene in the polymer and decreasing the internal diameter of the centerpin.

Metals have a high density and therefore increase the weight of batteries, decreasing the gravimetric energy density of the cell. Metals are also prone to corrosion and can react with the chemical components of the cell under extreme conditions. Batteries can also explode when electrically abused (i.e., overcharged), thermally abused, or mechanically abused. Plastics and polymers are more inert than metals but are thermally insulative. They also have lower mechanical rigidity compared to metals.

A plastic with a high concentration of graphene (e.g., at least about 15 wt %) can substantially improve several aspects of the centerpin component. In general, the higher the graphene concentration, the higher the heat transfer. For example, such a composition can be chemically inert, mechanically rigid, and lightweight. Additionally, such material is thermally conductive and therefore could be used as a passive heat pipe. The high concentration of graphene with its intrinsic lubricity facilitates the insertion of the centerpin into the jelly roll. It can lower the chance of rupture and surface damage to the jelly roll. This can solve a key manufacturing reject rate challenge, as the centerpin can be tightly fit into the core of the jelly roll at a high speed after the electrode assembly. Winding and sharp metal edges can be avoided. Also, producing the graphene-containing centerpins via injection molding can induce a high degree of graphene alignment parallel to the axis of the centerpin. This alignment can increase heat conduction to the top and bottom of the cell. Transferring the heat to the top and bottom plates of the battery modules is a common feature of the thermal management systems for rechargeable batteries, especially for electric vehicles.

In some embodiments, graphene flakes described herein can have any of the properties of the graphene flakes described in U.S. Pat. No. 9,469,542 ("the '542 patent"), filed Dec. 22, 2015 and titled, "Large Scale Production of Thinned Graphite, Graphene, and Graphite-Graphene Composites," the disclosure of which is hereby incorporated by reference in its entirety.

As used herein, the term "crystalline graphite" or "precursor crystalline graphite" refers to graphite-based material of a crystalline structure with a size configured to allow ball milling in a ball milling jar. For example, the crystalline graphite can be layered graphene sheets with or without defects, such defects comprising vacancies, interstitials, line defects, etc. The crystalline graphite may come in diverse forms, such as but not limited to ordered graphite including natural crystalline graphite, pyrolytic graphite (e.g., highly ordered pyrolytic graphite (HOPG)), graphite fiber, graphite rods, graphite minerals, graphite powder, flake graphite, any graphitic material modified physically and/or chemically to be crystalline, and/or the like. As another example, the crystalline graphite can be graphite oxide.

As used herein, the term "thinned graphite" refers to crystalline graphite that has had its thickness reduced to a thickness from about a single layer of graphene to about 1,200 layers, which is roughly equivalent to about 400 nm. As such, single layer graphene sheets, few-layer graphene (FLG) sheets, and in general multi-layer graphene sheets with a number of layers about equal to or less than 1,200 graphene layers can be referred as thinned graphite.

As used herein, the term "few-layer graphene" (FLG) refers to crystalline graphite that has a thickness from about 1 graphene layer to about 10 graphene layers.

As used herein, the term "lateral size" or "lateral sheet size" relates to the in-plane linear dimension of a crystalline material. For example, the linear dimension can be a radius, diameters, width, length, diagonal, etc., if the in-plane shape of the material can be at least approximated as a regular geometrical object (e.g., circle, square, etc.). If the in-plane shape of the material cannot be modeled by regular geometrical objects relatively accurately, the linear dimension can be expressed by characteristic parameters as is known in the art (e.g., by using shape or form factors).

As used in this specification, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

The term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or center line that is within plus or minus 5% of being linear.

As used herein, the term "set" and "plurality" can refer to multiple features or a singular feature with multiple parts. For example, when referring to a set of electrodes, the set of electrodes can be considered as one electrode with multiple portions, or the set of electrodes can be considered as multiple, distinct electrodes. Additionally, for example, when referring to a plurality of electrochemical cells, the plurality of electrochemical cells can be considered as multiple, distinct electrochemical cells or as one electrochemical cell with multiple portions. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

FIG. 1 a block diagram of a battery 100 with a centerpin 110 that includes graphene, according to an embodiment. As shown, the battery 100 includes the centerpin 110, an electrode assembly 130 including a positive electrode 132 and a negative electrode 134, a positive electrode tab 133 extending from the positive electrode 132, a negative electrode tab 135 extending from the negative electrode 134, a battery housing 140, a positive terminal 143, and a negative terminal 145.

The centerpin 110 includes a polymer and graphene flakes. In some embodiments, the polymer can include polyethylene, polypropylene, polyamide, thermoplastic polyolefin, acrylonitrile butadiene styrene, polycarbonate, polytetrafluoroethylene, ethylene-vinyl acetate (EVA), thermoplastic polyurethane (EPA), thermoplastic elastomers (TPE), or any combination thereof. In some embodiments, the centerpin 110 can include one or more flame retardant additives, antioxidants, stabilizers, metal oxides, or any combination thereof.

In some embodiments, the graphene flakes can have any of the physical properties of the graphene flakes described in the '542 patent. In some embodiments, the graphene flakes can have a lateral dimension of at least about 10 nm, at least about 50 nm, at least about 100 nm, at least about 500 nm, at least about 1 μm, at least about 2 μm, at least about 3 μm, at least about 4 μm, at least about 5 μm, at least about 6 μm, at least about 7 μm, at least about 8 μm, at least about 9 μm, at least about 10 μm, at least about 20 μm, at least about 30 μm, at least about 40 μm, at least about 50 μm, at least about 60 μm, at least about 70 μm, at least about 80 μm, at least about 90 μm, at least about 100 μm, at least about 110 μm, at least about 120 μm, at least about 130 μm, or at least about 140 μm. In some embodiments, the graphene flakes can have a lateral dimension of no more than about 150 μm, no more than about 140 μm, no more than about 130 μm, no more than about 120 μm, no more than about 110 μm, no more than about 100 μm, no more than about 90 μm, no more than about 80 μm, no more than about 70 μm, no more than about 60 μm, no more than about 50 μm, no more than about 40 μm, no more than about 30 μm, no more than about 20 μm, no more than about 10 μm, no more than about 5 μm, no more than about 1 μm, no more than about 500 nm, no more than about 100 nm, or no more than about 50 nm. Combinations of the above-referenced lateral dimensions of the graphene flakes are also possible (e.g., at least about 10 nm and no more than about 150 μm or at least about 10 μm and no more than about 100 μm), inclusive of all values and ranges therebetween. In some embodiments, the graphene flakes can have a lateral dimension of about 10 nm, about 50 nm, about 100 nm, about 500 nm, about 1 μm, about 2 μm, about 3 μm, about 4 μm, about 5 μm, about 6 μm, about 7 μm, about 8 μm, about 9 μm, about 10 μm, about 20 μm, about 30 μm, about 40 μm, about 50 μm, about 60 μm, about 70 μm, about 80 μm, about 90 μm, about 100 μm, about 110 μm, about 120 μm, about 130 μm, about 140 μm, or about 150 μm.

In some embodiments, the graphene flakes can have a thickness of at least about 1 graphene layer, at least about 2 graphene layers, at least about 3 graphene layers, at least about 4 graphene layers, at least about 5 graphene layers, at least about 6 graphene layers, at least about 7 graphene layers, at least about 8 graphene layers, at least about 9 graphene layers, at least about graphene layers, at least about 11 graphene layers, at least about 12 graphene layers, at least about 13 graphene layers, at least about 14 graphene layers, at least about 15 graphene layers, at least about 16 graphene layers, at least about 17 graphene layers, at least about 18 graphene layers, or at least about 19 graphene layers. In some embodiments, the graphene flakes can have a thickness of no more than about 20 graphene layers, no more than about 19 graphene layers, no more than about 18 graphene layers, no more than about 17 graphene layers, no more than about 16 graphene layers, no more than about 15 graphene layers, no more than about 14 graphene layers, no more than about 13 graphene layers, no more than about 12 graphene layers, no more than about 11 graphene layers, no more than about 10 graphene layers, no more than about 9 graphene layers, no more than about 8 graphene layers, no more than about 7 graphene layers, no more than about 6 graphene layers, no more than about 5 graphene layers, no more than about 4 graphene layers, no more than about 3 graphene layers, or no more than about 2 graphene layers. Combinations of the above-referenced thicknesses of the graphene flakes are also possible (e.g., at least about 1 graphene layer and no more than about 20 graphene layers or at least about 5 graphene layers and no more than about 10 graphene layers), inclusive of all values and ranges therebetween. In some embodiments, the graphene flakes can have a thickness of about 1 graphene layer, about 2 graphene layers, about 3 graphene layers, about 4 graphene layers, about 5 graphene layers, about 6 graphene layers, about 7 graphene layers, about 8 graphene layers, about 9 graphene layers, about graphene layers, about 11 graphene layers, about 12 graphene layers, about 13 graphene layers, about 14 graphene layers, about 15 graphene layers, about 16 graphene layers, about 17 graphene layers, about 18 graphene layers, about 19 graphene layers, or about 20 graphene layers.

In some embodiments, the graphene flakes can have an aspect ratio of at least about 50, at least about 100, at least about 500, at least about 1,000, at least about 5,000, at least about 10,000, at least about 20,000, at least about 30,000, or at least about 40,000. In some embodiments, the graphene flakes can have an aspect ratio of no more than about 50,000, no more than about 40,000, no more than about 30,000, no more than about 20,000, no more than about 10,000, no more than about 5,000, no more than about 1,000, no more than about 500, or no more than about 100. Combinations of the above-referenced aspect ratios are also possible (e.g., at least about 50 and no more than about 50,000 or at least about 500 and no more than about 5,000), inclusive of all values and ranges therebetween. In some embodiments, the graphene flakes can have an aspect ratio of about 50, about 100, about 500, about 1,000, about 5,000, about 10,000, about 20,000, about about 40,000, or about 50,000.

In some embodiments, the graphene flakes can make up at least about 5 wt %, at least about 10 wt %, at least about 15 wt %, at least about 20 wt %, at least about 25 wt %, at least about wt %, at least about 35 wt %, at least about 40 wt %, at least about 45 wt %, at least about 50 wt %, or at least about 55 wt % of the centerpin 110. In some embodiments, the graphene flakes can make up no more than about 60 wt %, no more than about 55 wt %, no more than about 50 wt %, no more than about 45 wt %, no more than about 40 wt %, no more than about 35 wt %, no more than about 30 wt %, no more than about 25 wt %, no more than about 20 wt %, no more than about 15 wt %, or no more than about 10 wt % of the centerpin 110. Combinations of the above-referenced weight percentages are also possible (e.g., at least about 5 wt % and no more than about 60 wt % or at least about 15 wt % and no more than about 50 wt %), inclusive of all values and ranges therebetween. In some embodiments, the graphene flakes can make up about 5 wt %, about 10 wt %, about 15 wt %, about 20 wt %, about 25 wt %, about 30 wt %, about 35 wt %, about 40 wt %, about 45 wt %, about 50 wt %, about 55 wt %, or about 60 wt % of the centerpin 110.

In some embodiments, the centerpin 110 can physically contact the electrode assembly 130. In some embodiments, a separator can be placed between the centerpin 110 and the positive terminal 143 and/or the negative terminal 145. In some embodiments, a space can exist between the centerpin 110 and the electrode assembly 130.

The electrode assembly 130 includes the positive electrode 132 (i.e., cathode) and the negative electrode 134 (i.e., anode). The electrode assembly 130 is formed into a jelly roll around the centerpin 110. In some embodiments, the positive electrode 132 can include a positive electrode plate (not shown) coated with a positive electrode active material (not shown). In some embodiments, the positive electrode active material can include a transition metal oxide including lithium cobalt oxide, lithium nickel oxide, and/or lithium manganese oxide. In some embodiments, the positive electrode 132 can include a conductive additive and a binder.

In some embodiments, the negative electrode 134 can include a negative electrode plate (not shown) coated with a negative electrode active material (not shown). In some embodiments, the negative electrode active material can include graphite, graphene, silicon, silicon oxide, and/or carbon. In some embodiments, the negative electrode 134 can include binder and a conductive additive.

In some embodiments, the electrode assembly 130 can include a separator (not shown) placed between the positive electrode 132 and the negative electrode 134 to avoid a short circuit and allow ions to move through the separator. The negative and positive electrode plates and the separator can be wound into the shape of a cylinder and contained in the housing 140. In some embodiments, the negative electrode plate can be made of copper foil. In some embodiments, the positive electrode plate can be made of aluminum foil. In some embodiments, the separator can be made of polyethylene, polypropylene, or any combination thereof.

In some embodiments, the positive electrode tab 133 can electrically couple the positive electrode 132 to the positive terminal 143. In some embodiments, the positive electrode tab 133 can be welded to the positive electrode plate. In some embodiments, the positive electrode tab 133 can be composed of aluminum or an aluminum alloy. In some embodiments, the negative electrode tab 135 can electrically couple the negative electrode to a negative terminal 145. In some embodiments, the negative electrode tab 135 can be welded to the negative electrode plate. In some embodiments, the negative electrode tab 135 can be composed of nickel or a nickel alloy.

In some embodiments, the positive terminal 143 can be integrated into the housing 140. In some embodiments, the positive terminal 143 can connect the battery 100 to a voltage source. In some embodiments, the negative terminal 145 can be integrated into the housing 140. In some embodiments, the negative terminal 145 can connect the battery 100 to a voltage source.

Figure 2A:
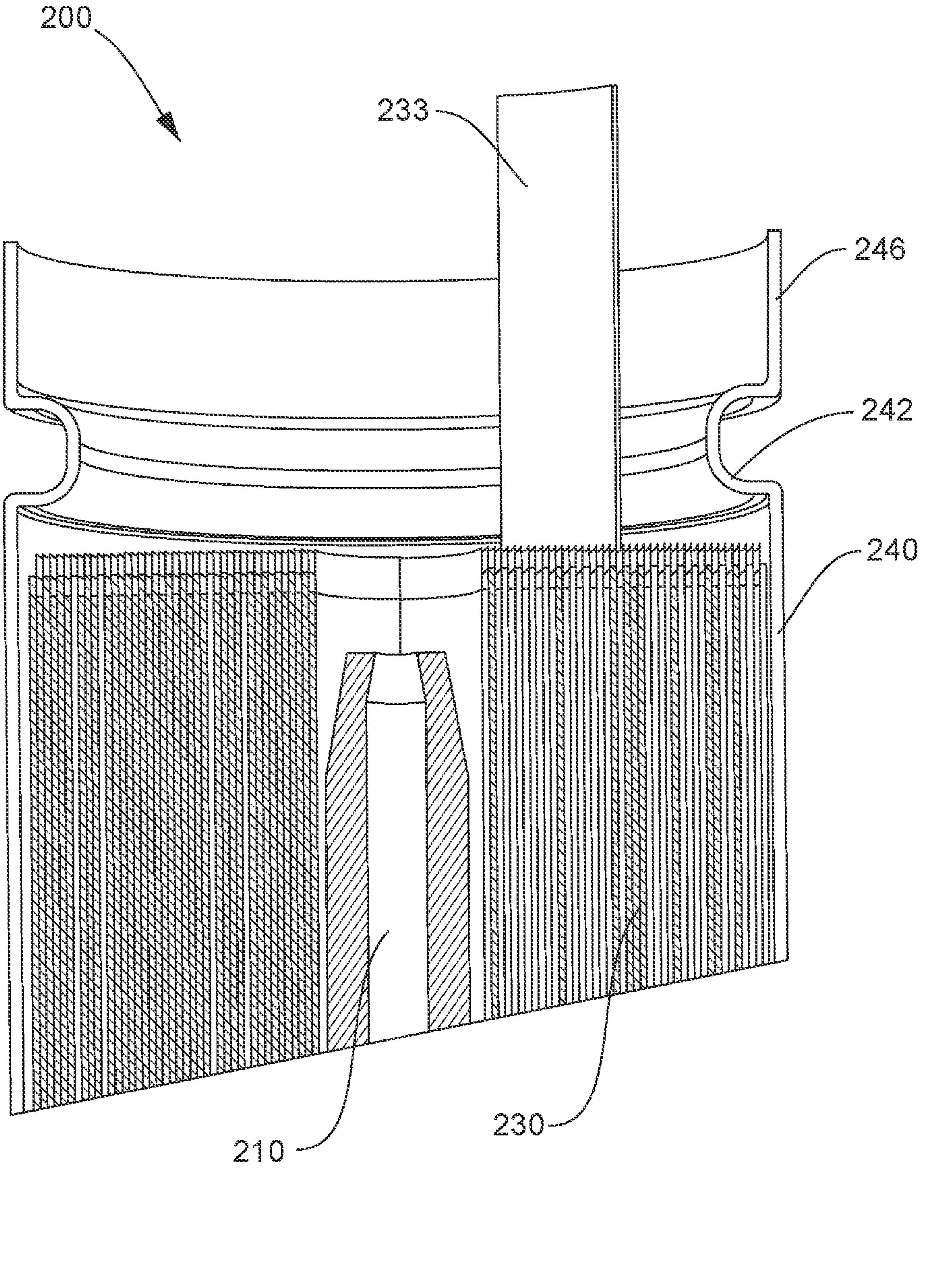
FIGS. 2A-2B are illustrations of a battery with a graphene-containing centerpin, according to an embodiment.
Figure 2B:
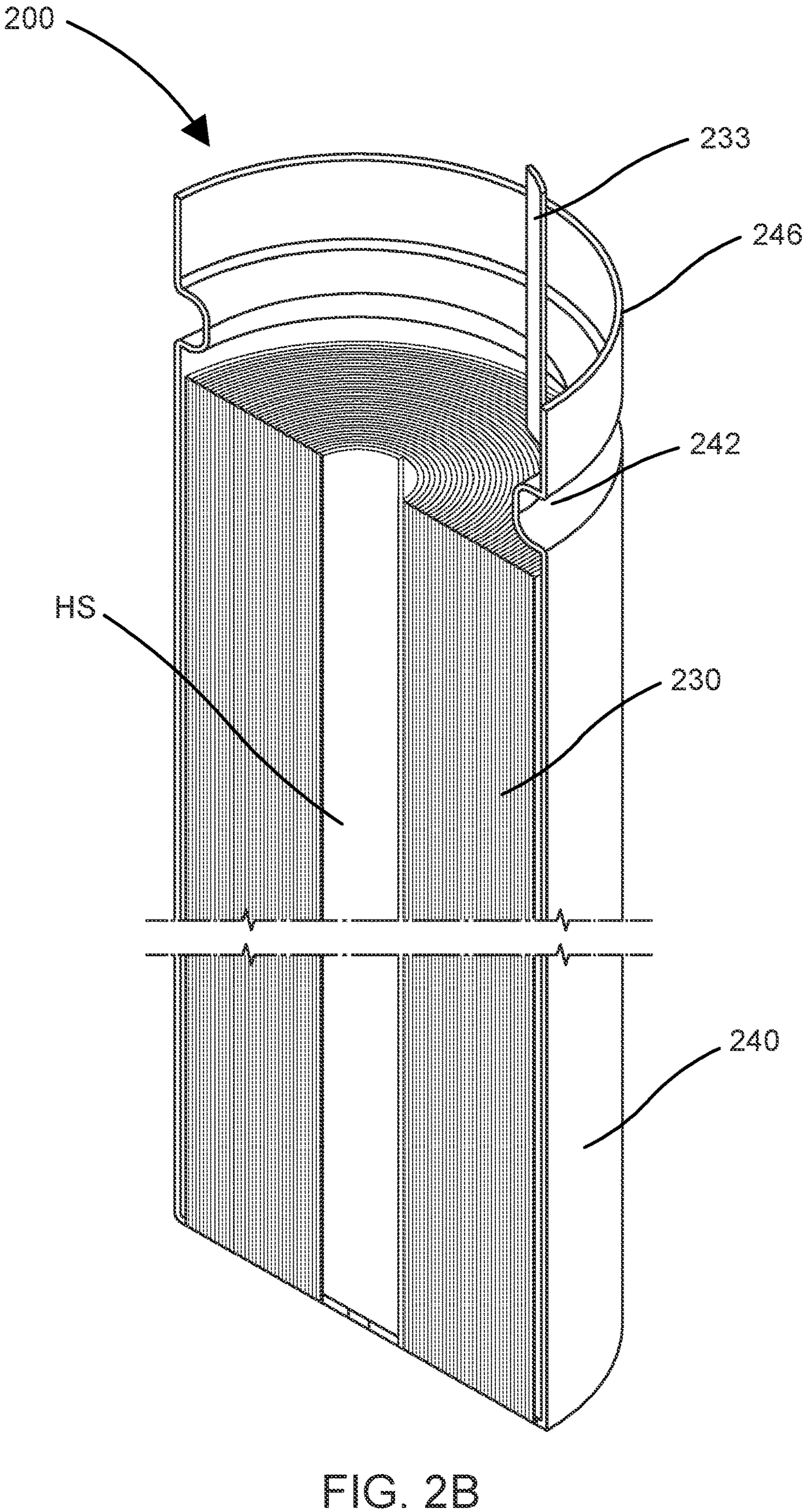

FIGS. 2A-2B are illustrations of a battery 200 with a graphene-containing centerpin, according to an embodiment. As shown, the battery 200 includes a centerpin 210, an electrode assembly 230, a positive electrode tab 233, a negative electrode tab (not shown), a housing 240, a beading 242, and a cap assembly 246. In some embodiments, the centerpin 210, the electrode assembly 230, the positive electrode tab 233, the negative electrode tab, and the housing 240 can be the same or substantially similar to the centerpin 110, the electrode 130, the positive electrode tab 133, the negative electrode tab, and the housing 140, as described above with respect to FIG. 1. Thus, certain aspects of the centerpin 210, the electrode assembly 230, the positive electrode tab 233, the negative electrode tab, and the housing 240 are not described in greater detail herein. FIG. 2A shows a detailed view of a top portion of the battery 200, while FIG. 2B shows a view of a larger portion of the battery 200 with the centerpin 210 removed, such that a hollow space HS is present.

In some embodiments, the centerpin 210 can have a diameter of at least about 1 mm, at least about 1.5 mm, at least about 2 mm, at least about 2.5 mm, at least about 3 mm, at least about 3.5 mm, at least about 4 mm, at least about 4.5 mm, at least about 5 mm, at least about 5.5 mm, at least about 6 mm, at least about 6.5 mm, at least about 7 mm, at least about 7.5 mm, at least about 8 mm, at least about 8.5 mm, at least about 9 mm, or at least about 9.5 mm. In some embodiments, the centerpin 210 can have a diameter of no more than about 10 mm, no more than about 9.5 mm, no more than about 9 mm, no more than about 8.5 mm, no more than about 8 mm, no more than about 7.5 mm, no more than about 7 mm, no more than about 6.5 mm, no more than about 6 mm, no more than about 5.5 mm, no more than about 5 mm, no more than about 4.5 mm, no more than about 4 mm, no more than about 3.5 mm, no more than about 3 mm, no more than about 2.5 mm, no more than about 2 mm, or no more than about 1.5 mm. Combinations of the above-referenced diameters of the centerpin 210 are also possible (e.g., at least about 1 mm and no more than about mm or at least about 2 mm and no more than about 8 mm), inclusive of all values and ranges therebetween. In some embodiments, the centerpin 210 can have a diameter of about 1 mm, about 1.5 mm, about 2 mm, about 2.5 mm, about 3 mm, about 3.5 mm, about 4 mm, about 4.5 mm, about mm, about 5.5 mm, about 6 mm, about 6.5 mm, about 7 mm, about 7.5 mm, about 8 mm, about 8.5 mm, about 9 mm, about 9.5 mm, or about 10 mm.

In some embodiments, the centerpin 210 can be flush with the interior of the electrode assembly 230. In other words, the centerpin 210 can have a diameter that matches the hollow space HS. In some embodiments, a gap can exist between the centerpin 210 and the interior of the electrode assembly 230. In some embodiments, the gap between the electrode assembly 230 and the centerpin 210 can be about 100 μm, about 200 μm, about 300 μm, about 400 μm, about 500 μm, about 600 μm, about 700 μm, about 800 μm, about 900 μm, or about 1 mm, inclusive of all values and ranges therebetween. In some embodiments, the centerpin 210 can contact either of the electrode terminals of the battery 200. In some embodiments, the centerpin 210 can be shorter than the full length of the battery 200, such that the centerpin 210 does not contact either of the electrode terminals of the battery 200.

The housing 240 contains the centerpin 210 and the electrode assembly 230. In some embodiments, the housing 240 can be composed of metal. In some embodiments, the beading 242 can aid in securing the battery 200 onto various surfaces. In some embodiments, the beading 242 can mechanically lock the electrode assembly 230 in the housing 240, such that the electrode 230 remains in place if the housing 240 is turned on its side or turned upside down (i.e., before the addition of electrolyte or the placement of the cap assembly 246). The cap assembly 246 aids in holding together the housing 240 and the contents therein. The cap assembly 246 can act as a lid for the battery 200. In some embodiments, the cap assembly 246 can include a vent, or a pathway for gases to escape during thermal runaway. The cap assembly 246 can be designed to facilitate crimping where the positive electrode tab 233 is welded to the cap assembly 246. In other words, the cap assembly 246 can be shaped to facilitate crimping where the housing 240 is sealed.

Figure 3A:
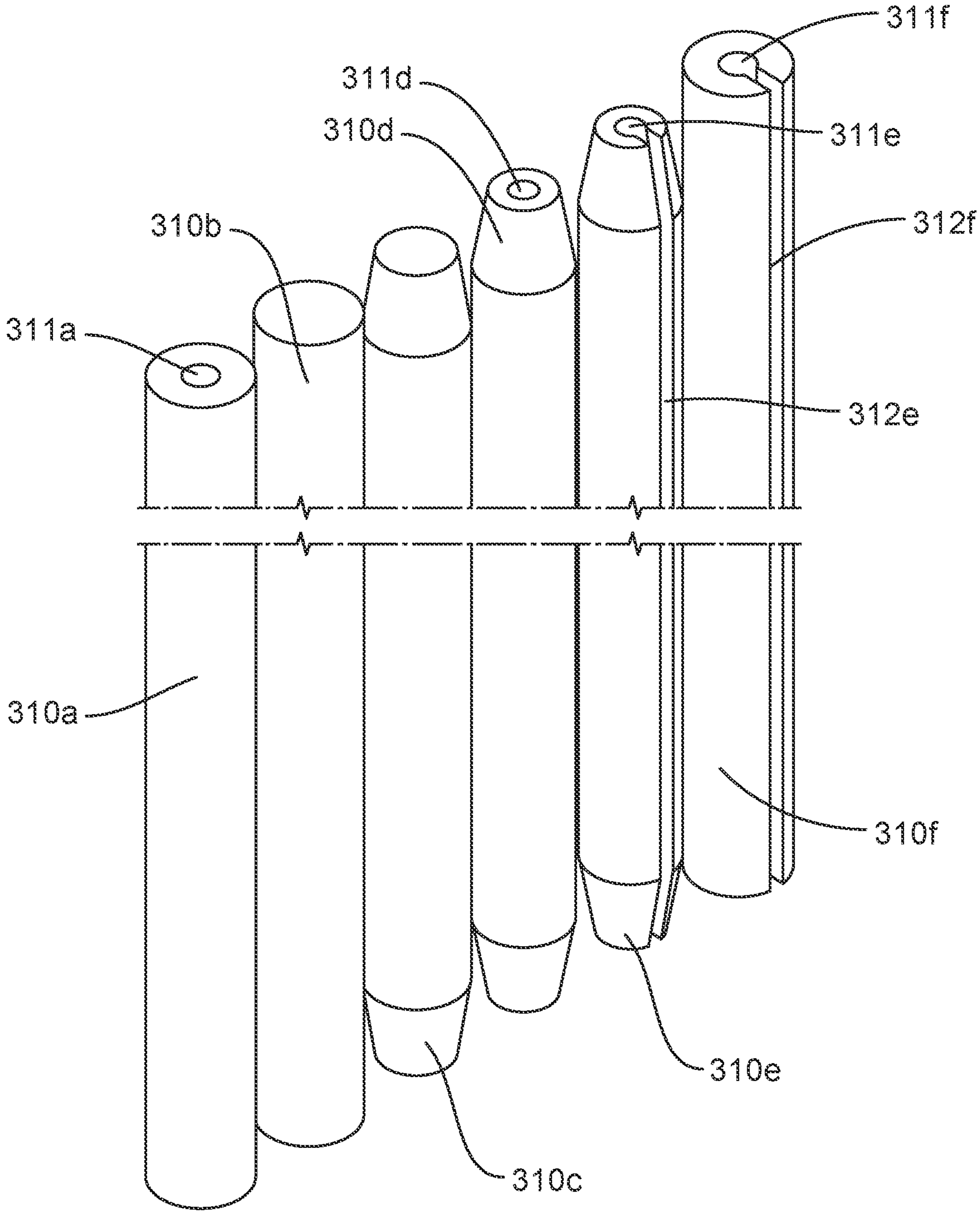
FIGS. 3A-3B are illustrations of graphene-containing centerpins, according to various embodiments.
Figure 3B:
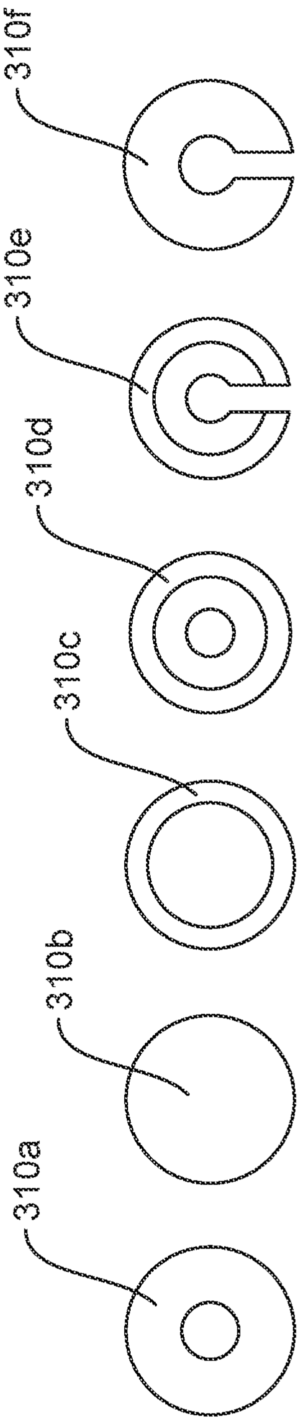

FIGS. 3A-3B are illustrations of graphene-containing centerpins, according to various embodiments. FIG. 3A is a perspective view and FIG. 3B is a cross-sectional view of the graphene-containing centerpins. FIGS. 3A-3B include a graphene-containing centerpin 310*a* with a bore 311*a* and no tapering, a graphene-containing centerpin 310*b* with no bore and no tapering, a graphene-containing centerpin 310*c* with tapering and no bore, a graphene-containing centerpin 310*d* with tapering and a bore 311*d*, a graphene-containing centerpin 310*e* with tapering and a bore 311*e* and a slit 312*e* extending the length of the center pin 310*e*, and a graphene-containing centerpin 310*f* with a bore 311*f* and a slit 312*f* with no tapering. The centerpins 310*a*, 310*b*, 310*c*, 310*d*, 310*e*, 310*f* are collectively referred to herein as the centerpins 310. In some embodiments, the centerpins 310 can be the same or substantially similar to the centerpin 110, as described above with reference to FIG. 1. Thus, certain aspects of the centerpins 310 are not described in greater detail herein.

In some embodiments, the bores 311*a*, 311*d*, 311*e*, 311*f* can have a diameter that is at least about 10%, at least about 20%, at least about 30%, at least about 40%, at least about 50%, or at least about 60% of the full diameter of the centerpins 310*a*, 310*d*, 310*e*, 310*f*. In some embodiments, the bores 311*a*, 311*d*, 311*e*, 311*f* can have a diameter that is no more than about 70%, no more than about 60%, no more than about 50%, no more than about 40%, no more than about 30%, or no more than about 20% of the full diameter of the centerpins 310*a*, 310*d*, 310*e*, 310*f*. Combinations of the above-referenced diameter percentages are also possible (e.g., at least about 10% and no more than about 70% or at least about 20% and no more than about 50%), inclusive of all values and ranges therebetween. In some embodiments, the bores 311*a*, 311*d*, 311*e*, 311*f* can have a diameter that is about 10%, about 20%, about 30%, about 40%, about 50%, about 60%, or about 70% of the full diameter of the centerpins 310*a*, 310*d*, 310*e*, 310*f*.

In some embodiments, the bores 311*a*, 311*d*, 311*e*, 311*f* can have a diameter of at least about 100 μm, at least about 200 μm, at least about 300 μm, at least about 400 μm, at least about 500 μm, at least about 600 μm, at least about 700 μm, at least about 800 μm, at least about 900 μm, at least about 1 mm, at least about 2 mm, at least about 3 mm, or at least about 4 mm. In some embodiments, the bores 311*a*, 311*d*, 311*e*, 311*f* can have a diameter of no more than about 5 mm, no more than about 4 mm, no more than about 3 mm, no more than about 2 mm, no more than about 1 mm, no more than about 900 μm, no more than about 800 μm, no more than about 700 μm, no more than about 600 μm, no more than about 500 μm, no more than about 400 μm, no more than about 300 μm, or no more than about 200 μm. Combinations of the above-referenced bore diameters are also possible (e.g., at least about 100 μm and no more than about 5 mm or at least about 400 μm and no more than about 1 mm), inclusive of all values and ranges therebetween. In some embodiments, the bores 311*a*, 311*d*, 311*e*, 311*f* can have a diameter of about 100 μm, about 200 μm, about 300 μm, about 400 μm, about 500 μm, about 600 μm, about 700 μm, about 800 μm, about 900 μm, about 1 mm, about 2 mm, about 3 mm, about 4 mm, or about 5 mm. In some embodiments, the bores 311*a*, 311*d*, 311*e*, 311*f* can be centered on the centerpins 310*a*, 310*d*, 310*e*, 310*f*. In some embodiments, the bores 311*a*, 311*d*, 311*e*, 311*f* can be off center. As shown, the centerpins 310*a*, 310*d*, 310*e*, 310*f* each include a single bore. In some embodiments, the centerpins 310*a*, 310*d*, 310*e*, 310*f* can include multiple bores. In some embodiments, the centerpins 310*a*, 310*d*, 310*e*, 310*f* can include about 2, about 3, about 4, about 5, about 6, about 7, about 8, about 9, or about 10 bores, inclusive of all values and ranges therebetween. In some embodiments, the diameters of the bores 311*a*, 311*d*, 311*e*, 311*f* can depend on battery size (e.g., 18650 vs. 21700 vs. 46800), as the diameter of the centerpins 310*a*, 310*d*, 310*e*, 310*f* increases with cell size.

Tapering of the ends of the centerpins 310 can ease the insertion of the centerpins 310 into void volumes on the interior of electrode assemblies. In some embodiments, the tapering angle can be at least about 1°, at least about 2°, at least about 3°, at least about 4°, at least about 5°, at least about 6°, at least about 7°, at least about 8°, at least about 9°, at least about 10°, at least about 20°, at least about 30°, at least about 40°, at least about 50°, at least about 60°, or at least about 70°. In some embodiments, the tapering angle can be no more than about 80°, no more than about 70°, no more than about 60°, no more than about 50°, no more than about 40°, no more than about 30°, no more than about 20°, no more than about 10°, no more than about 9°, no more than about 8°, no more than about 7°, no more than about 6°, no more than about 5°, no more than about 4°, no more than about 3°, or no more than about 2°. Combinations of the above-referenced tapering angles are also possible (e.g., at least about 1° and no more than about 80° or at least about 20° and no more than about 50°), inclusive of all values and ranges therebetween. In some embodiments, the tapering angle can be about 1°, about 2°, about 3°, about 4°, about 5°, about 6°, about 7°, about 8°, about 9°, about 10°, about 20°, about 30°, about 40°, about 50°, about 60°, about 70°, or about 80°.

In the tapered centerpins 310*c*, 310*d*, 310*e*, the top and bottom surface of the centerpins 310*c*, 310*d*, 310*e* have a smaller diameter than a central portion of the centerpins 310*c*, 310*d*, 310*e*. In some embodiments, the top and/or bottom surface of the centerpins 310*c*, 310*d*, 310*e* can have a diameter of at least about 500 μm, at least about 600 μm, at least about 700 μm, at least about 800 μm, at least about 900 μm, at least about 1 mm, or at least about 2 mm. In some embodiments, the top and/or bottom surface of the centerpins 310*c*, 310*d*, 310*e* can have a diameter of no more than about 3 mm, no more than about 2 mm, no more than about 1 mm, no more than about 900 μm, no more than about 800 μm, no more than about 700 μm, or no more than about 600 μm. Combinations of the above-referenced diameters of the top and/or bottom surface of the centerpins 310*c*, 310*d*, 310*e* is also possible (e.g., at least about 500 μm and no more than about 3 mm or at least about 800 μm and no more than about 1 mm), inclusive of all values and ranges therebetween. In some embodiments, the top and/or bottom surface of the centerpins 310*c*, 310*d*, 310*e* can have a diameter of about 500 μm, about 600 μm, about 700 μm, about 800 μm, about 900 μm, about 1 mm, about 2 mm, or about 3 mm.

In some embodiments, the tapered section of the centerpins 310*c*, 310*d*, 310*e* can be present on both terminal ends of the centerpins 310*c*, 310*d*, 310*e*. In some embodiments, the tapered section of the centerpins 310*c*, 310*d*, 310*e* can be present on only one terminal end of the centerpins 310*c*, 310*d*, 310*e*. In some embodiments, a single tapered section can extend along about 5%, about 10%, about 15%, about 20%, about 25%, or about 30% of the length of the centerpins 310*c*, 310*d*, 310*e*, inclusive of all values and ranges therebetween.

The slits 312*e*, 312*f* can produce a C-shaped cross section in the centerpins 310*e*, 310*f*. The slits 312*e*, 312*f* can make the centerpins 310*e*, 310*f* more flexible. This added flexibility can reduce the incidence of fracture of the centerpins 310*e*, 310*f*. The slits 312*e*, 312*f* can also allow additional heat to be expelled from the batteries, into which the centerpins 310*e*, 310*f* are placed. In addition, the C-shaped cross section of the centerpins 310*e*, 310*f*, can allow for a spring effect or easier size adaptability, dissipating thermal and/or mechanical tensions.

Figure 4:
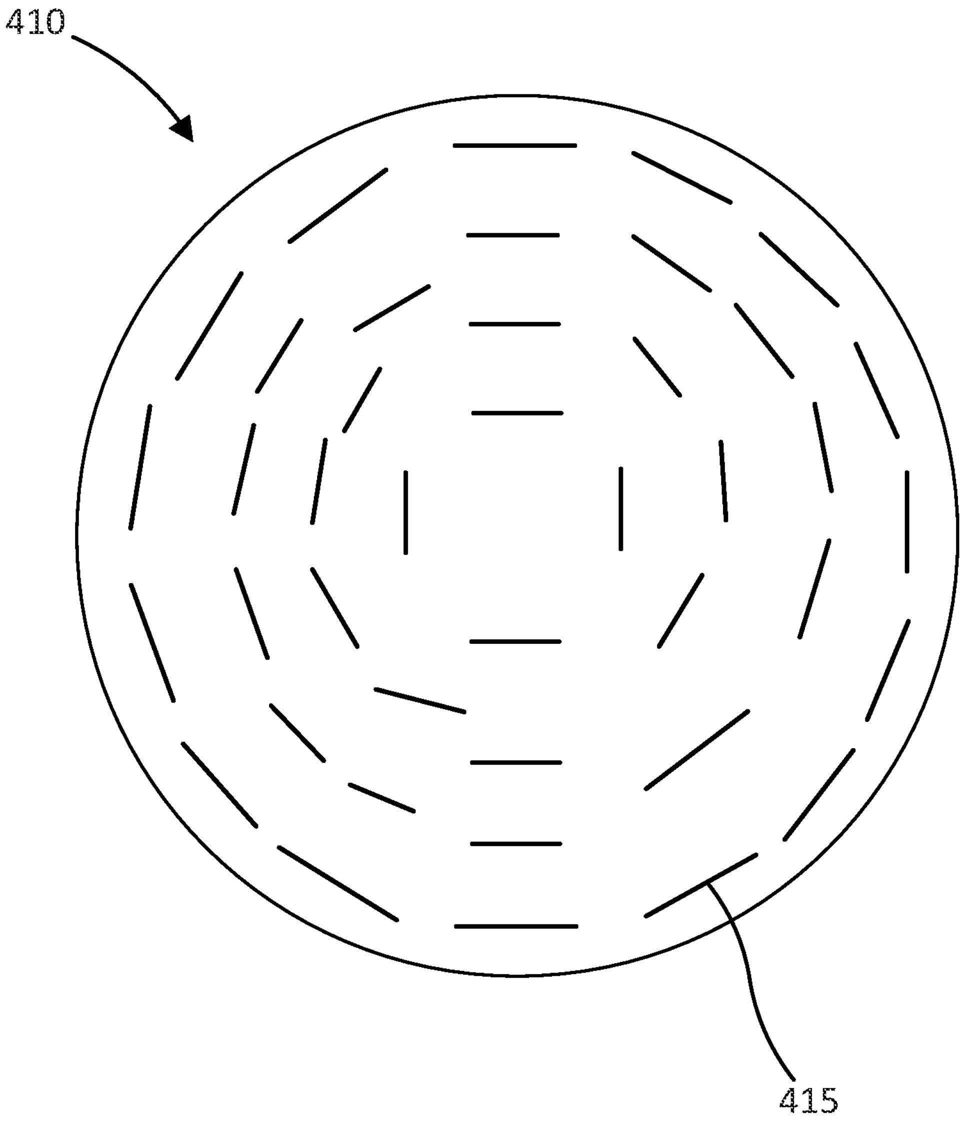
FIG. 4 is an illustration of a cross section of a graphene-containing centerpin, according to an embodiment.

FIG. 4 is an illustration of a cross section of a graphene-containing centerpin 410, according to an embodiment. As shown, the centerpin 410 includes graphene flakes 415. In some embodiments, the centerpin 410 can be the same or substantially similar to the centerpin 110, as described above with reference to FIG. 1. Thus, certain aspects of the centerpin 410 are not described in greater detail herein. From the injection molding process, the graphene flakes 415 can align themselves around the center of the centerpin 410 during the process. In some embodiments, the alignment of the graphene flakes 415 can be based on the flow of the injection molding streams.

Figure 5:
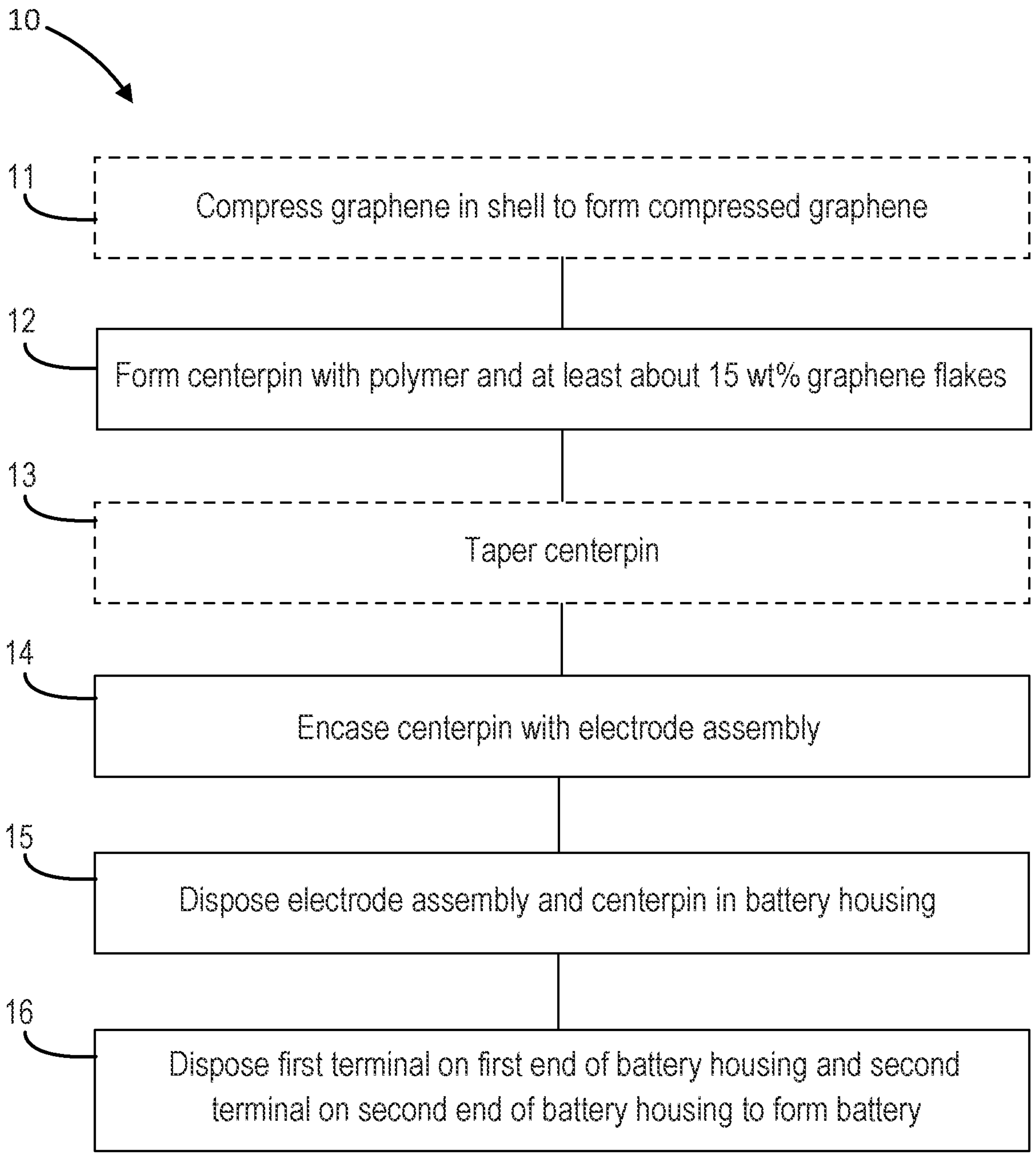
FIG. 5 is a block diagram of a method of forming a battery with a graphene-containing centerpin, according to an embodiment.

FIG. 5 is a block diagram of a method 10 of forming a battery with a graphene-containing centerpin, according to an embodiment. As shown, the method 10 optionally includes compressing graphene in a shell to form compressed graphene at step 11. The method 10 includes forming a centerpin with a polymer and at least 15 wt % graphene at step 12. The method 10 optionally includes tapering the centerpin at step 13. The method 10 further includes encasing the centerpin with an electrode assembly at step 14, disposing the electrode assembly and the centerpin in the battery housing at step 15, and disposing a first terminal on a first end of the battery housing and a second terminal on a second end of the battery housing to form the battery at step 16.

Step 11 is optional and includes compressing graphene in a shell to form compressed graphene. This can lead to a centerpin with a large amount of graphene in the center. In some embodiments, the shell can include a plastic shell. In some embodiments, the pressure can be at least about 5 MPa (gauge), at least about 6 MPa, at least about 10 MPa, at least about 15 MPa, at least about 20 MPa, at least about 25 MPa, at least about 30 MPa, at least about 35 MPa, at least about 40 MPa, at least about 45 MPa, at least about 50 MPa, at least about 55 MPa, at least about MPa, at least about 65 MPa, at least about 70 MPa, at least about 75 MPa, at least about 80 MPa, at least about 85 MPa, at least about 90 MPa, or at least about 95 MPa. In some embodiments, the pressure can be no more than about 100 MPa, no more than about 95 MPa, no more than about 90 MPa, no more than about 85 MPa, no more than about 80 MPa, no more than about 75 MPa, no more than about 70 MPa, no more than about 65 MPa, no more than about 60 MPa, no more than about 55 MPa, no more than about 50 MPa, no more than about 45 MPa, no more than about 40 MPa, no more than about 35 MPa, no more than about 30 MPa, no more than about 25 MPa, no more than about 20 MPa, no more than about 15 MPa, no more than about 10 MPa, or no more than about 6 MPa. Combinations of the above-referenced pressures are also possible (e.g., at least about 5 MPa and no more than about 100 MPa, or at least about 6 MPa and no more than about 60 MPa), inclusive of all values and ranges therebetween. In some embodiments, the pressure can be about 5 MPa (gauge), about 6 MPa, about 10 MPa, about 15 MPa, about 20 MPa, about 25 MPa, about 30 MPa, about 35 MPa, about 40 MPa, about 45 MPa, about 50 MPa, about 55 MPa, about 60 MPa, about 65 MPa, about 70 MPa, about 75 MPa, about MPa, about 85 MPa, about 90 MPa, about 95 MPa, about 100 MPa.

Step 12 includes forming the centerpin via a polymer and at least about 15 wt % graphene flakes. In some embodiments, the formation can include coating the compressed graphene with the polymer. In some embodiments, the formation of the centerpin can be via injection molding. In some embodiments, a fluid including the polymer and the graphene flakes can be injected into a mold having the final shape of the centerpin (e.g., the mold can include tapered ends, solid portions boring out the center of the centerpin, slits, etc.).

Step 13 is optional and includes tapering the centerpin. In some embodiments, the mold in step 12 can include tapered ends, such that step 13 is excluded. In some embodiments, the tapering can include removing a portion of the centerpin, such that the ends are tapered. In some embodiments, the tapering can be via machining (e.g., via a lathe). In some embodiments, the tapering can be via grinding, sanding, or any other method involving rubbing away a portion of the centerpin.

Step 14 includes encasing the centerpin with the electrode assembly. In some embodiments, step 14 can include building the electrode assembly around the centerpin (e.g., by wrapping the electrodes and the separator around the centerpin). In some embodiments, step 14 can include inserting the centerpin into a void volume at the center of the electrode assembly. Step 15 includes disposing the electrode assembly and the centerpin into a battery housing. The battery housing provides protective casing to prevent outside influences from damaging the batteries. Step 16 includes disposing a first terminal on a first end of the battery housing and disposing a second terminal on a second end of the battery housing to form a battery. The terminals close the housing and fluidically seal the contents inside the housing from the outside.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. A battery, comprising:
an electrode assembly formed in an annulus with a void volume in a center of the annulus, the electrode assembly including an anode and a cathode;
a centerpin disposed in the void volume, the centerpin including graphene particles suspended in a polymer, the centerpin in physical contact with the electrode assembly and configured to provide structural support for the electrode assembly; and
a battery housing disposed around an outside surface of the electrode assembly.

2. The battery of claim 1, wherein the void volume is a first void volume, and wherein the centerpin includes a second void volume.

3. The battery of claim 2, wherein the centerpin includes a slit that extends lengthwise along a length of the centerpin, the slit being an extension of the second void volume.

4. The battery of claim 1, wherein the centerpin includes a first terminal end and a second terminal end, wherein at least one of the first terminal end or the second terminal end is tapered.

5. The battery of claim 1, wherein the battery housing includes a first terminal end and a second terminal end, the first terminal end including a cap assembly.

6. The battery of claim 5, wherein the cap assembly forms a beading groove in the battery housing.

7. The battery of claim 1, wherein the centerpin includes at least about 15 wt % graphene.

8. The battery of claim 7, wherein the centerpin includes at least one of a flame retardant additive, an antioxidant, a metal oxide, or a stabilizer.

9. A method of forming a battery, the method comprising:
forming a centerpin including a polymer and at least about 15 wt % of graphene flakes;
encasing the centerpin with an electrode assembly, the electrode assembly including an anode and a cathode;
disposing the electrode assembly and the centerpin in a battery housing; and
disposing a first terminal on a first end of the battery housing and a second terminal on a second end of the battery housing to form the battery.

10. The method of claim 9, wherein the centerpin is formed into a shape with a void volume on its interior.

11. The method of claim 9, wherein the polymer includes at least one of polyethylene, polypropylene, polyamide, thermoplastic polyolefin, acrylonitrile butadiene styrene, polycarbonate, or polytetrafluoroethylene.

12. The method of claim 9, further comprising:
compressing graphene in a shell to form compressed graphene, wherein forming the centerpin is via compressing graphene flakes in a shell to form compressed graphene and coating the compressed graphene with the polymer.

13. The method of claim 9, wherein forming the centerpin is via injection molding of an injectate, the injectate including at least about 15 wt % graphene flakes suspended in the polymer.

14. The method of claim 9, wherein encasing the centerpin with the electrode assembly is via insertion of the centerpin into a void volume in a central region of the electrode assembly.

15. A battery, comprising:

a centerpin including a mixture of graphene particles and a polymer;

an electrode assembly including an anode, a cathode, and a separator disposed between the anode and the cathode, the electrode assembly disposed around the centerpin such that the centerpin provides structural support to the electrode assembly; and a battery housing encasing the electrode assembly.

16. The battery of claim 15, wherein the polymer includes at least one of polyethylene, polypropylene, polyamide, thermoplastic polyolefin, acrylonitrile butadiene styrene, polycarbonate, polytetrafluoroethylene, ethylene-vinyl acetate (EVA), thermoplastic polyurethane (EPA), or thermoplastic elastomers (TPE).

17. The battery of claim 15, wherein the centerpin includes at least about 15 wt % graphene flakes.

18. The battery of claim 15, further comprising:

a cathode current collector contacting the cathode;

a cathode tab extending from the cathode current collector and protruding through the battery housing;

an anode current collector contacting the anode; and an anode tab extending from the anode current collector and protruding through the battery housing.

19. The battery of claim 15, wherein the centerpin includes at least one of a flame retardant additive, an antioxidant, a metal oxide, or a stabilizer.

20. The battery of claim 15, wherein the centerpin includes a void volume.

21. The battery of claim 15, wherein the centerpin includes a tapered end.

* * * * *